United States Patent
Croak et al.

(10) Patent No.: US 9,137,361 B2
(45) Date of Patent: *Sep. 15, 2015

(54) METHOD AND APPARATUS FOR ENABLING GLOBAL TELEPHONY CAPABILITIES IN COMMUNICATION NETWORKS

(71) Applicant: AT&T Intellectual Property II, L.P., Atlanta, GA (US)

(72) Inventors: Marian Croak, Fair Haven, NJ (US); Hossein Eslambolchi, San Diego, CA (US)

(73) Assignee: AT&T Intellectual Property II, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/071,147

(22) Filed: Nov. 4, 2013

(65) Prior Publication Data

US 2014/0056181 A1  Feb. 27, 2014

Related U.S. Application Data

(63) Continuation of application No. 11/092,220, filed on Mar. 29, 2005, now Pat. No. 8,576,832.

(51) Int. Cl.
*H04M 3/42* (2006.01)
*H04M 7/00* (2006.01)
*H04M 15/00* (2006.01)

(52) U.S. Cl.
CPC ...... *H04M 3/42306* (2013.01); *H04M 3/42263* (2013.01); *H04M 7/006* (2013.01); *H04M 15/56* (2013.01); *H04M 3/42297* (2013.01); *H04M 2215/202* (2013.01); *H04M 2215/24* (2013.01)

(58) Field of Classification Search
None
See application file for complete search history.

(56) References Cited

U.S. PATENT DOCUMENTS

| | | | |
|---|---|---|---|
| 5,440,615 | A | 8/1995 | Caccuro et al. |
| 5,978,678 | A | 11/1999 | Houde et al. |
| 6,069,939 | A | 5/2000 | Fung et al. |
| 6,707,901 | B1 | 3/2004 | Hodges et al. |
| 7,164,936 | B2 | 1/2007 | Heatley |
| 8,576,832 | B2 * | 11/2013 | Croak et al. ............ 370/352 |
| 2002/0039367 | A1 | 4/2002 | Seppala et al. |
| 2002/0064149 | A1 | 5/2002 | Elliott et al. |
| 2002/0101860 | A1 * | 8/2002 | Thornton et al. ......... 370/352 |
| 2002/0197991 | A1 | 12/2002 | Anvekar et al. |
| 2004/0028080 | A1 * | 2/2004 | Samarasinghe et al. ..... 370/486 |
| 2004/0180646 | A1 | 9/2004 | Donley et al. |

(Continued)

OTHER PUBLICATIONS

"Universal Phone Number from Lingo". Primus Telecommunications, Inc. Feb. 17, 2005 <http://web.archive.org/web/20050217111120/www.lingo.com/voip/features/universal_number_voice_over_ip.jsp>.*

(Continued)

*Primary Examiner* — Faruk Hamza
*Assistant Examiner* — Andrew Oh

(57) ABSTRACT

A method and apparatus for enabling a network service provider, e.g., a VoIP network provider, to create configuration files containing network based parameters that support global telephony capabilities (e.g., in country services) such as in country ring tones, dialing patterns, network announcements, and signaling tones that can be offered to users who want in country telephony capabilities independent of their location is disclosed. These global telephony capability configurations can be downloaded to intelligent IP phones or based in the VoIP network for access by subscribers' telephony devices.

20 Claims, 5 Drawing Sheets

(56) References Cited

U.S. PATENT DOCUMENTS

| | | |
|---|---|---|
| 2004/0198326 A1 | 10/2004 | Hirani |
| 2004/0203761 A1 | 10/2004 | Baba et al. |
| 2004/0267628 A1 | 12/2004 | Stillman |
| 2005/0213567 A1 | 9/2005 | Mullins et al. |
| 2006/0050688 A1* | 3/2006 | Panagopoulos et al. ...... 370/356 |
| 2006/0067506 A1 | 3/2006 | Flockhart et al. |
| 2006/0165082 A1 | 7/2006 | Pfeffer et al. |
| 2006/0174018 A1 | 8/2006 | Zhu et al. |

OTHER PUBLICATIONS

European Search Report for EP 06111717, copy consists of 7 unnumbered pages.

Anonymous: "SkypeIn" Internet Article, http://web.archive.org/web/20050328011622/http://www.skype.com/products/skyein/; Mar. 28, 2005.

Sinnreich/MCI H, et al., "SIP Telephony Device Requirements and Configuration; draft-sinnreich-sipdev-req-05.txt," IETF Standard-Working-Draft, Internet Engineering Task Force, IETF, CH, No. 5, Dec. 2004.

Telecommunications and Internet Protocol Harmonization Over Networks (TIPHON); TIPHON/UMTS Harmonozation: General aspects; ETSI TS 102 285.

Garcia-Martin Ericsson M. $3^{rd}$-Generation Partnership Project (3GPP) Release 5 requirements on the Session Initiation Protocol (SIP), draft-ietf-sipping-3gpp-r5-requirements-00.txt.

Canadian Office Action Dated Aug. 12, 2010, 3 pages.

"Universal Phone Number from Lingo". *Primus Telecommunication, Inc.*, Feb. 17, 2005, http://web.archive.org/web/20050217111120/www.lingo.com/voip/features/universal_number_voice_over_ip.jsp.

* cited by examiner

US 9,137,361 B2

METHOD AND APPARATUS FOR ENABLING GLOBAL TELEPHONY CAPABILITIES IN COMMUNICATION NETWORKS

This application is a continuation of U.S. patent application Ser. No. 11/092,220, filed Mar. 29, 2005, now U.S. Pat. No. 8,576,832 B2, issued on Nov. 5, 2013, and is herein incorporated by reference in its entirety.

The present invention relates generally to communication networks and, more particularly, to a method and apparatus for enabling global telephony capabilities in packet networks, e.g. Voice over Internet Protocol (VoIP) networks.

BACKGROUND OF THE INVENTION

For various reasons, users in one country may desire to have in country phone numbers in a different country, thereby allowing the users to appear local in regions anywhere in the world. For example, users who live in the United States but are expatriates of India may want a telephone number that appears local to a region in Bangalore. These "in country" local numbers allow friends and families of subscribers to avoid the high cost of making international calls when calling the subscribers who are globally dispersed.

Therefore, a need exists for a method and apparatus for enabling global telephony capabilities in a packet network, e.g., a VoIP network.

SUMMARY OF THE INVENTION

In one embodiment, the present invention enables a network service provider, e.g., a VoIP network provider, to create configuration files containing network based parameters that support global telephony capabilities (e.g., in country services) such as in country ring tones, dialing patterns, network announcements, and signaling tones that can be offered to users who want in country telephony capabilities independent of their location. These global telephony capability configurations can be downloaded to intelligent IP phones or based in the VoIP network for access by subscribers' telephony devices.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
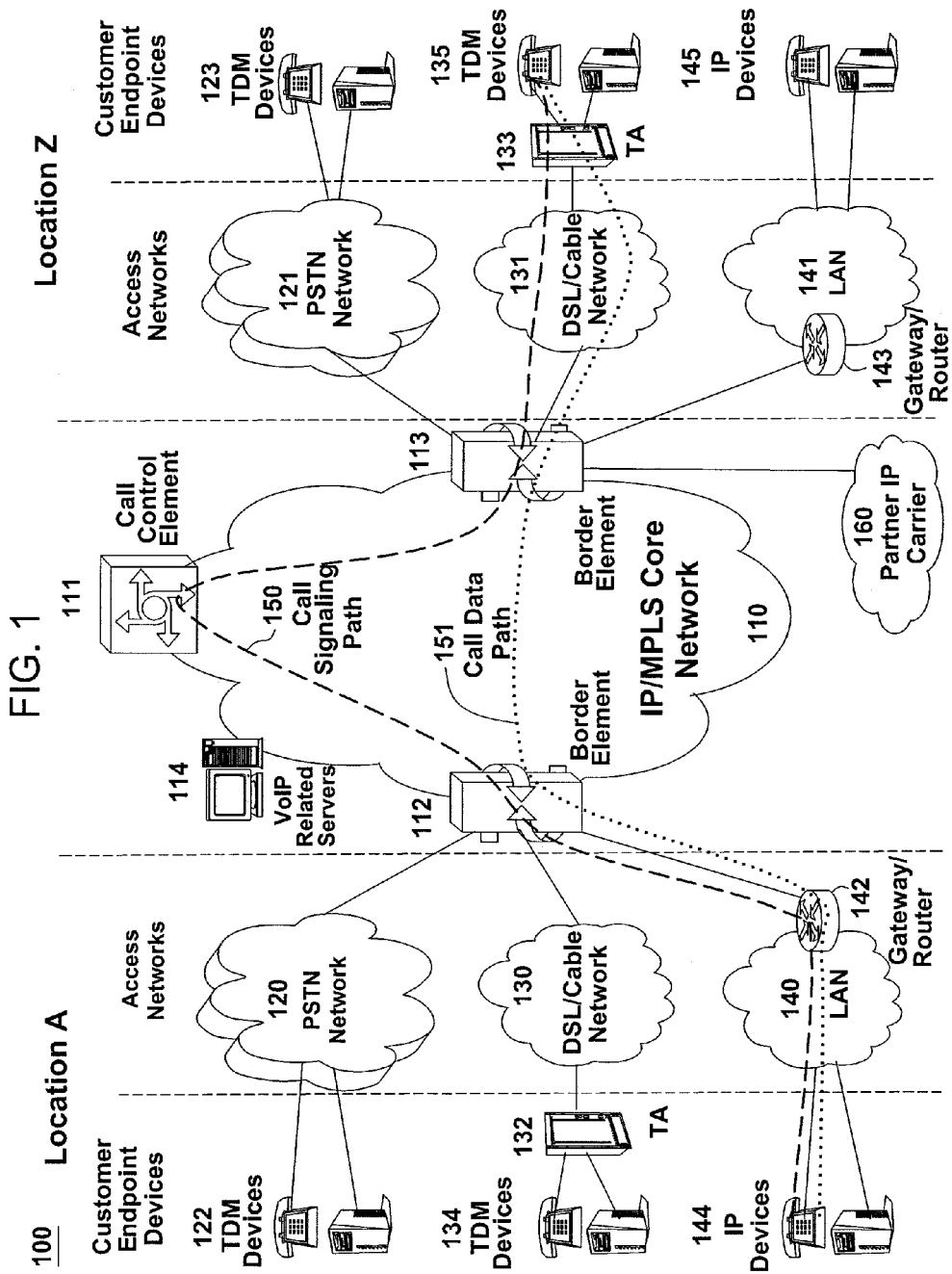
FIG. 1 illustrates an exemplary Voice over Internet Protocol (VoIP) network related to the present invention.

To better understand the present invention, FIG. 1 illustrates an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, and VoIP related servers 114. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related servers in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related server 114 to obtain the information to complete this call. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP-ACK message if SIP is used, is sent in the reverse direction back to the CCE 111. After the CCE 111 receives the call acknowledgement message, it will then send a call acknowledgement signaling message, such as a SIP-ACK message if SIP is used, toward the calling party. In addition, the CCE 111 also provides the necessary information of the call to both BE 112 and BE 113 so that the call data exchange can proceed directly between BE 112 and BE 113. The call signaling path 150 and the call data path 151 are illustratively shown in FIG. 1. Note that the call signaling path and the call data path are different because once a call has been setup up between two endpoints, the CCE 111 does not need to be in the data path for actual direct data exchange.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

In one embodiment, network service provider, e.g., VoIP network providers, can offer in country numbers for users who desire to appear local in regions anywhere in the world. For example, users who live in the United States but are expatriates of India can receive a VoIP telephone number that appears local to a region in Bangalore. These "in country" local numbers allow friends and families of subscribers to avoid the high cost of making international calls when calling the subscribers who are globally dispersed.

To address this need, the present invention enables a VoIP network provider to create configuration files containing network based parameters that support global telephony capabilities such as in country ring tones, dialing patterns, network announcements, and signaling tones that can be offered to users who want in country telephony capabilities independent of their location. These global telephony capability configurations can be downloaded to intelligent IP phones or based in the VoIP network for access by subscribers' telephony devices.

Figure 2:
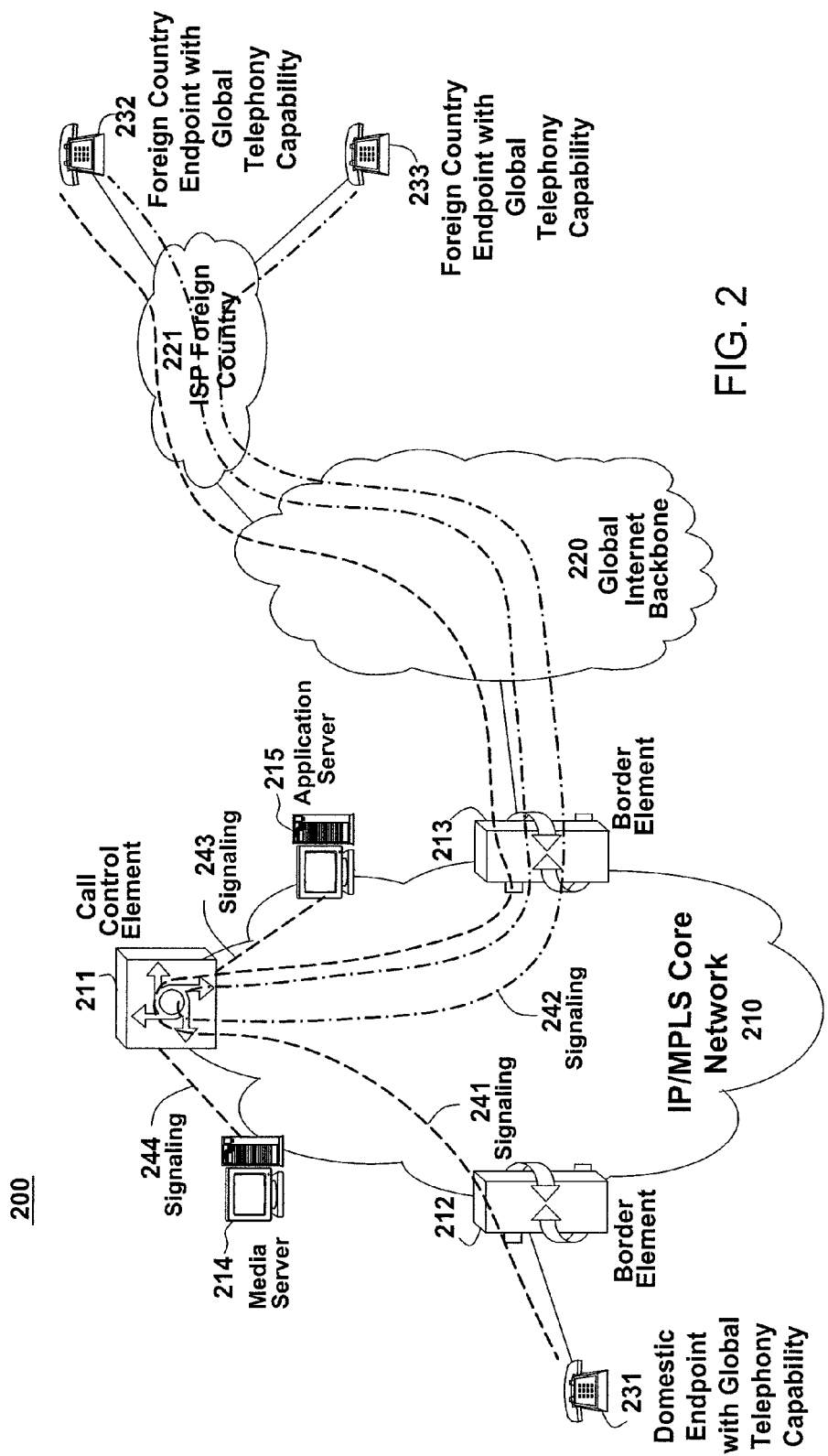
FIG. 2 illustrates an example of global telephony capabilities in a VoIP network of the present invention.

FIG. 2 illustrates an example of the global telephony capabilities in a packet network, e.g., a VoIP network. In FIG. 2, endpoint 231, endpoint 232, and endpoint 233 all subscribe to the global telephony capability service feature (e.g., an in country service) with the same in country options. Endpoint 231 is located domestically within the United States, while endpoints 232 and 233 are located in a foreign country, e.g., FC1, that corresponds to the in country options subscribed by endpoints 231, 232, and 233. The network creates configuration files with the associated "in country" options for each of the endpoints that subscribes to the global telephony capability service feature. For each endpoint, the configuration file comprises the in country phone number assigned, the in country ring tones, the in country dialing patterns, the in country network announcements, and the in country signaling tones associated with the selected foreign country FC1 chosen by the subscriber. These configuration files are stored in the network to be retrieved and used at a later time. In particular, endpoints 231, 232, and 233 are all assigned phone numbers that correspond to the selected foreign country, FC1, phone number format. Endpoints 232 and 233 are connected to the VoIP network via their local Internet Service Provider (ISP) 221 in the corresponding foreign country. ISP 221 is connected via the public internet backbone 220 to reach VoIP network 210.

When endpoint 232 makes a call to endpoint 231, endpoint 232 sends a call setup message to CCE 211 via BEs 213 and 212 using signaling flow 241. When CCE 211 receives the call setup message, CCE 211 communicates with AS 215, using flow 243, to find out that both the calling and the called endpoints have subscribed to the global telephony capability service feature with in country options of foreign country FC1 and retrieves all the associated service logic, including in country configurations, related to the global telephony capability service feature subscribed for foreign country FC1. CCE 211 accepts and uses the calling and the called endpoint phone numbers with format of foreign country FC1 and translates the called endpoint phone number into its corresponding terminating IP address. CCE 211 also uses the appropriate in country ring tone when sending the call setup message to the called endpoint 231. If necessary, CCE 211 communicates with Media Server 214, using flow 244, to relay the appropriate in country network announcements to either the calling endpoint or the called endpoint. In this particular example, the call between endpoints 231 and 232 appears to be a local or regional call within foreign country FC1 even though the calling and the called endpoints are globally dispersed.

Similarly, when endpoint 232 makes a call to endpoint 233, endpoint 232 sends a call setup message to CCE 211 via BE 213 using signaling flow 242. When CCE 211 receives the call setup message, CCE 211 communicates with AS 215, using flow 243, to find out that both the calling and the called endpoints have subscribed to the global telephony capability service feature with in country options of foreign country FC1 and retrieves all the associated service logic, including in country configurations, related to the global telephony capability service feature subscribed for foreign country FC1. CCE 211 accepts and uses the calling and the called endpoint phone numbers with format of foreign country FC1 and translates the called endpoint phone number into its corresponding terminating IP address. CCE 211 also uses the appropriate in country ring tone when sending the call setup message to the called endpoint 233. If necessary, CCE 211 communicates with Media Server 214, using flow 244, to relay the appropriate in country network announcements to either the calling endpoint or the called endpoint. In this particular example, the call between endpoints 232 and 233 appears to be a local or regional call within foreign country FC1 even though the call is placed through the VoIP network located within the United States.

Note that the global telephony capability service feature can be subscribed regardless of the location of the endpoint. The endpoint can be in any countries supported by the VoIP network provider.

Figure 3:
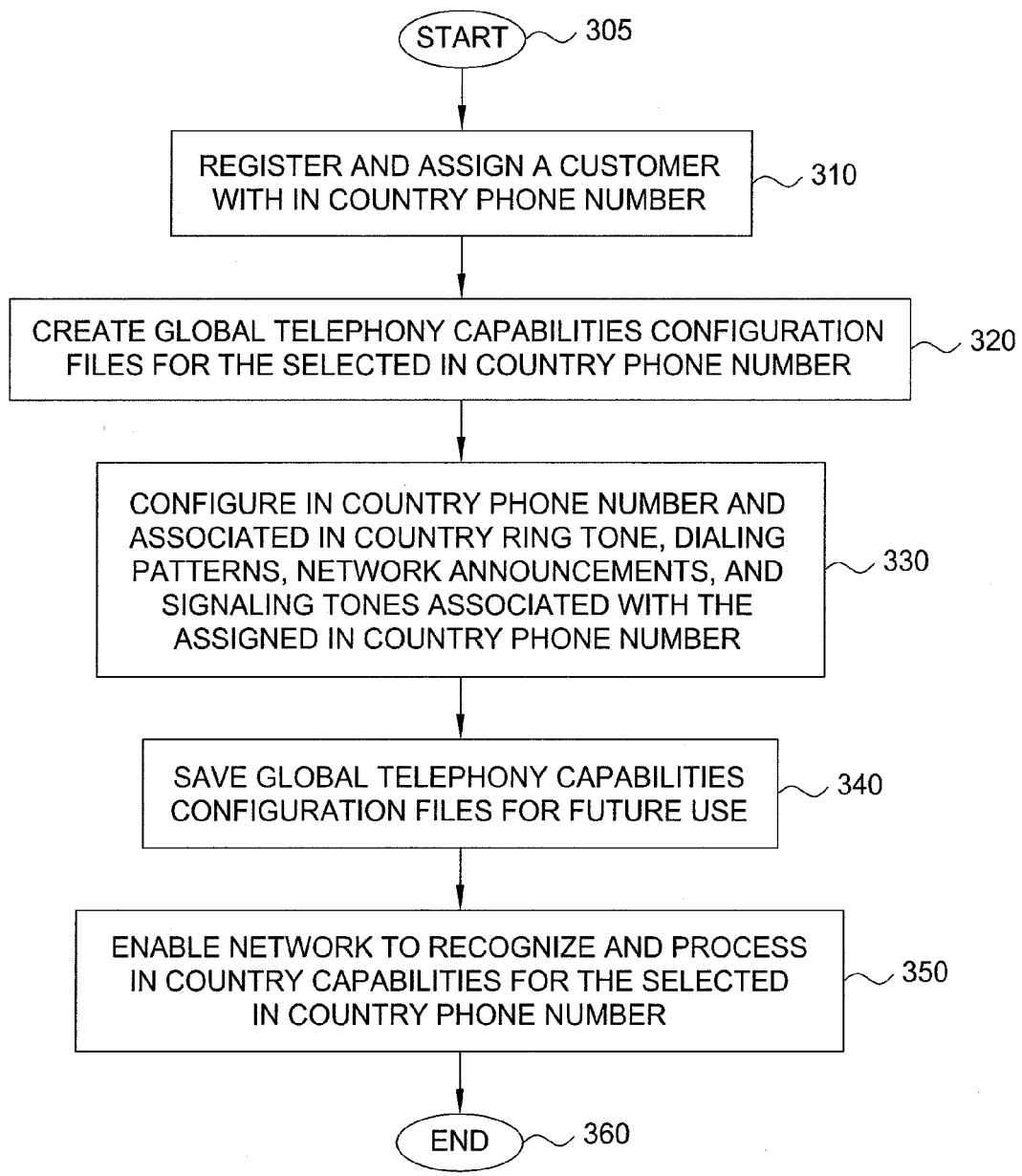
FIG. 3 illustrates a flowchart of a method for enabling global telephony capabilities in a VoIP network of the present invention.

FIG. 3 illustrates a flowchart of a method 300 for enabling global telephony capabilities in a packet network, e.g., a VoIP network. Method 300 starts in step 305 and proceeds to step 310.

In step 310, the method 300 registers and assigns a customer who subscribes to the global telephony capability service feature (e.g., an in country service) with an in country phone number of a foreign country selected by the customer. In step 320, the method creates a configuration file associated with the global telephony capability service feature subscribed by the customer. In step 330, the method configures the in country options of the selected foreign country of the global telephony capability service feature including in country phone number and associated in country ring tones, dialing patterns, network announcements, and signaling tones, etc. In step 340, the method saves and stores the created configuration file in the network for later use. The saved configuration file can be downloaded and used by the subscribed endpoint if the endpoint is an intelligent VoIP endpoint device capable of supporting the saved options. The saved configuration file can also be used by the network to provide the appropriate service logic during call setup on behalf of the endpoints if the endpoints are not intelligent VoIP device capable of supporting the saved options. In step 350, the method enables the network to recognize and process calls, according to the selected foreign country in country options, made or received by the customer who subscribes to the global telephony capability service feature. The method ends in step 360.

Figure 4:
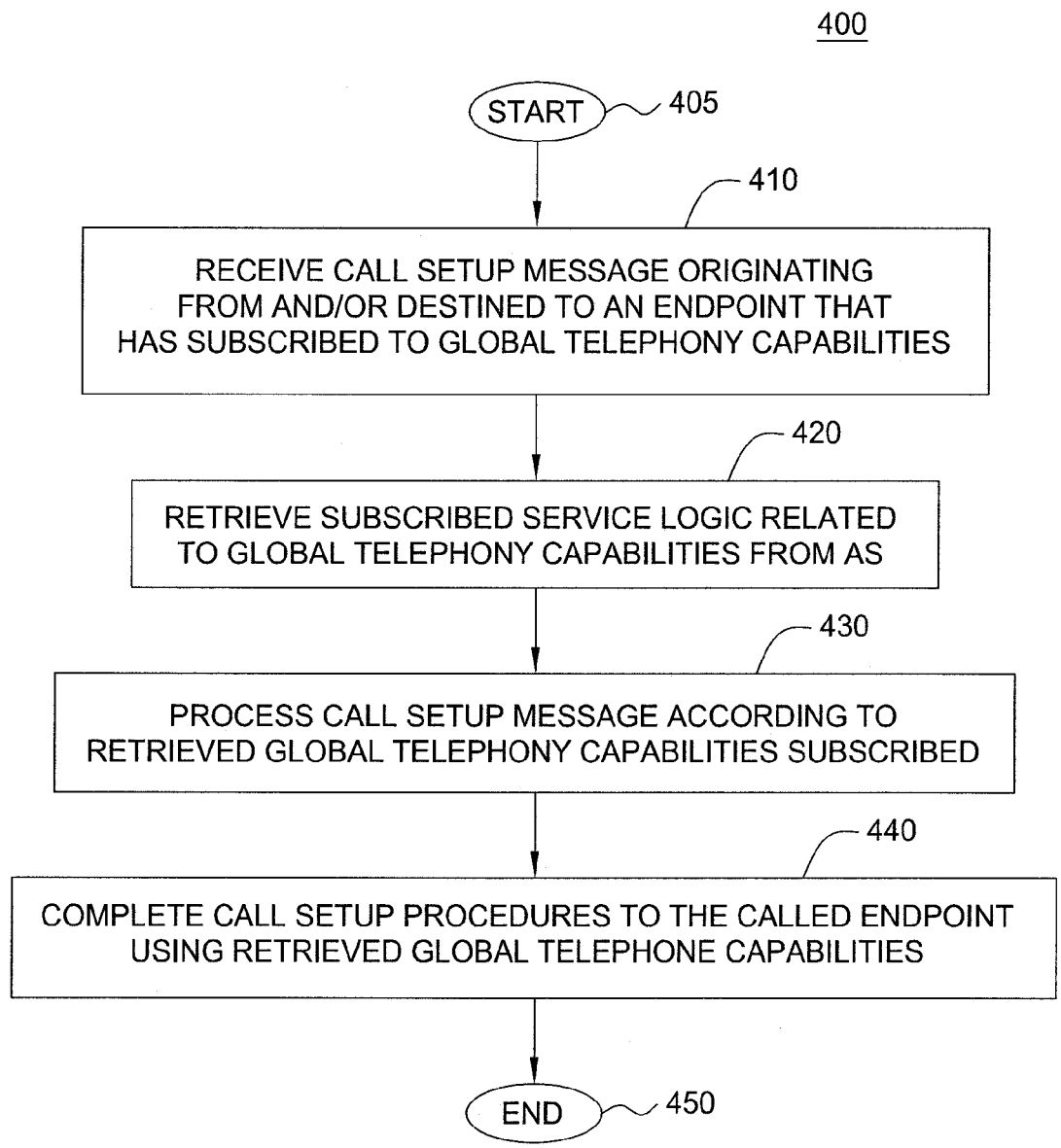
FIG. 4 illustrates a flowchart of a method for processing a global telephony call in a VoIP network of the present invention.

FIG. 4 illustrates a flowchart of a method 400 for processing a global telephony call in a packet network, e.g., a VoIP network. Method 400 starts in step 405 and proceeds to step 410.

In step 410, the method 400 receives a call setup message originating from and/or destined to an endpoint that has subscribed to the global telephony capability service feature. In step 420, the method retrieves subscribed service logic, including in country options of the subscribed foreign country, related to the global telephony capability service feature from the AS. In step 430, the method processes call setup message according to retrieved global telephony capability in country options subscribed. This includes, but is not limited to, the translation of the calling and the called endpoints in country phone numbers into their corresponding IP addresses, the sending of ring tones appropriate to the selected foreign country in country options, and the playing of network announcements appropriated to the selected foreign country in country options. In step 440, the method completes the call setup procedures to the called endpoint according to the retrieved global telephony capability in country options and service logic. The method ends in step 450.

Figure 5:
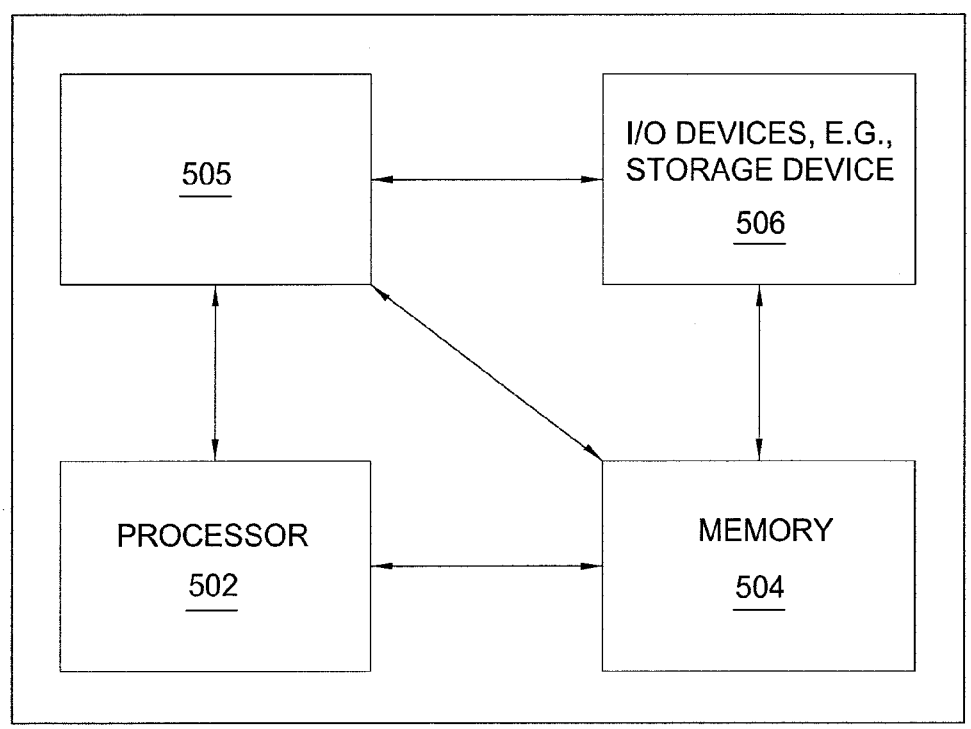
FIG. 5 illustrates a high level block diagram of a general purpose computer suitable for use in performing the functions described herein.

FIG. 5 depicts a high level block diagram of a general purpose computer suitable for use in performing the functions described herein. As depicted in FIG. 5, the system 500 comprises a processor element 502 (e.g., a CPU), a memory 504, e.g., random access memory (RAM) and/or read only memory (ROM), a global telephony capabilities module 505, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present global telephony capabilities module or process 505 can be loaded into memory 504 and executed by processor 502 to implement the functions as discussed above. As such, the present global telephony capabilities process 505 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing an in-country telephone call service in a communication network, comprising:

providing, via a call control element, the in-country telephone call service in accordance with a configuration file associated with a selected country on behalf of an endpoint of a customer, wherein the configuration file stored in an application server is retrieved by the call control element from the application server, wherein the configuration file is associated with the selected country registered by the customer, wherein the selected country is different than a country where the customer is located;

assigning, via the call control element, an in-country phone number to the customer of the selected country, wherein the endpoint associated with the in-country phone number is physically located in a country that is different than the selected country and where a calling party in the selected country is not charged for an international call to the in-country phone number, wherein both the customer and the calling party are subscribed to the in-country telephone call service;

receiving, via the call control element, a call setup message associated with the endpoint that has subscribed to the in-country telephone call service;

retrieving, via the call control element, an in-country option of the selected country from the configuration file stored in the application server; and processing, via the call control element, the call setup message via the communication network in accordance with the in-country option retrieved from the configuration file stored in the communication network, wherein the processing comprises the call control element accepting the in-country phone number of the endpoint of the customer and a calling party number of the calling party and translates the in-country phone number into a corresponding terminating internet protocol address of the endpoint of the customer.

2. The method of claim 1, wherein the communication network is a voice over internet protocol network.

3. The method of claim 1, wherein the configuration file contains a configuration for an in-country ring tone and wherein the configuration file is associated with the assigned in-country phone number of the selected country.

4. The method of claim 1, wherein the configuration file is downloaded to the endpoint to support the in-country telephone call service.

5. The method of claim 1, wherein the configuration file contains a configuration for an in-country dialing pattern, and wherein the configuration file is associated with the assigned in-country phone number of the selected country.

6. The method of claim 1, wherein the configuration file contains a configuration for an in-country network announcement, and wherein the configuration file is associated with the assigned in-country phone number of the selected country.

7. The method of claim 1, wherein the configuration file contains a configuration for an in-country signaling tone, and wherein the configuration file is associated with the assigned in-country phone number of the selected country.

8. The method of claim 1, wherein the call control element contacts a media server to relay an in-country network announcement to either the endpoint of the customer or the calling party.

9. A non-transitory computer-readable medium storing a plurality of instructions which, when executed by a processor of a call control element, cause the processor to perform operations for providing an in-country telephone call service in a communication network, the operations comprising:
    providing the in-country telephone call service in accordance with a configuration file associated with a selected country on behalf of an endpoint of a customer, wherein the configuration file stored in an application server is retrieved by the call control element from the application server, wherein the configuration file is associated with the selected country registered by the customer, wherein the selected country is different than a country where the customer is located;
    assigning an in-country phone number to the customer of the selected country, wherein the endpoint associated with the in-country phone number is physically located in a country that is different than the selected country and where a calling party in the selected country is not charged for an international call to the in-country phone number, wherein both the customer and the calling party are subscribed to the in-country telephone call service;
    receiving a call setup message associated with the endpoint that has subscribed to the in-country telephone call service;
    retrieving an in-country option of the selected country from the configuration file stored in the application server; and
    processing the call setup message via the communication network in accordance with the in-country option retrieved from the configuration file stored in the communication network, wherein the processing comprises the call control element accepting the in-country phone number of the endpoint of the customer and a calling party number of the calling party and translates the in-country phone number into a corresponding terminating internet protocol address of the endpoint of the customer.

10. The non-transitory computer-readable medium of claim 9, wherein the communication network is a voice over internet protocol network.

11. The non-transitory computer-readable medium of claim 9, wherein the configuration file contains a configuration for an in-country ring tone and wherein the configuration file is associated with the assigned in-country phone number of the selected country.

12. The non-transitory computer-readable medium of claim 9, wherein the configuration file is downloaded to the endpoint to support the in-country telephone call service.

13. The non-transitory computer-readable medium of claim 9, wherein the configuration file contains a configuration for an in-country dialing pattern, and wherein the configuration file is associated with the assigned in-country phone number of the selected country.

14. The non-transitory computer-readable medium of claim 9, wherein the configuration file contains a configuration for an in-country network announcement, and wherein the configuration file is associated with the assigned in-country phone number of the selected country.

15. The non-transitory computer-readable medium of claim 9, wherein the configuration file contains a configuration for an in-country signaling tone, and wherein the configuration file is associated with the assigned in-country phone number of the selected country.

16. The non-transitory computer-readable medium of claim 9, wherein the call control element contacts a media server to relay an in-country network announcement to either the endpoint of the customer or the calling party.

17. An apparatus for providing an in-country telephone call service in a communication network, comprising:
    a processor of a call control element; and
    a non-transitory computer-readable medium storing a plurality of instructions which, when executed by the processor, cause the processor to perform operations, the operations comprising:
        providing the in-country telephone call service in accordance with a configuration file associated with a selected country on behalf of an endpoint of a customer, wherein the configuration file stored in an application server is retrieved by the call control element from the application server, wherein the configuration file is associated with the selected country registered by the customer, wherein the selected country is different than a country where the customer is located;
        assigning an in-country phone number to the customer of the selected country, wherein the endpoint associated with the in-country phone number is physically located in a country that is different than the selected country and where a calling party in the selected country is not charged for an international call to the in-country phone number, wherein both the customer and the calling party are subscribed to the in-country telephone call service;
        receiving a call setup message associated with the endpoint that has subscribed to the in-country telephone call service;
        retrieving an in-country option of the selected country from the configuration file stored in the application server; and
        processing the call setup message via the communication network in accordance with the in-country option retrieved from the configuration file stored in the communication network, wherein the processing comprises the call control element accepting the in-country phone number of the endpoint of the customer and a calling party number of the calling party and translates the in-country phone number into a corresponding terminating internet protocol address of the endpoint of the customer.

18. The apparatus of claim 17, wherein the communication network is a voice over internet protocol network.

19. The apparatus of claim 17, wherein the configuration file contains a configuration for an in-country ring tone and wherein the configuration file is associated with the assigned in-country phone number of the selected country.

20. The apparatus of claim 17, wherein the configuration file is downloaded to the endpoint to support the in-country telephone call service.

* * * * *